(12) United States Patent
Misra et al.

(10) Patent No.: US 11,640,525 B2
(45) Date of Patent: May 2, 2023

(54) SYNTHESIS OF SEQUENTIAL, SPECTRAL, AND TIME-SERIES DATA

(71) Applicant: The Board of Regents of the University of Oklahoma, Norman, OK (US)

(72) Inventors: Siddharth Misra, Norman, OK (US); Jiabo He, Norman, OK (US)

(73) Assignee: The Board of Regents of the University of Oklahoma, Norman, OK (US)

( * ) Notice: Subject to any disclaimer, the term of this patent is extended or adjusted under 35 U.S.C. 154(b) by 792 days.

(21) Appl. No.: 16/592,531

(22) Filed: Oct. 3, 2019

(65) Prior Publication Data
US 2020/0034711 A1  Jan. 30, 2020

Related U.S. Application Data

(63) Continuation-in-part of application No. 16/520,323, filed on Jul. 23, 2019, now abandoned.
(Continued)

(51) Int. Cl.
*G06F 16/28* (2019.01)
*G06N 3/04* (2023.01)
*G06N 3/08* (2023.01)

(52) U.S. Cl.
CPC .............. *G06N 3/08* (2013.01); *G06F 16/285* (2019.01); *G06N 3/04* (2013.01)

(58) Field of Classification Search
CPC ............ G06N 3/08; G06N 20/00; G06N 3/04; G06N 3/02; G06N 3/0445; G06N 3/0454;
(Continued)

(56) References Cited

U.S. PATENT DOCUMENTS

| | | | |
|---|---|---|---|
| 2002/0091489 A1* | 7/2002 | Ye | G01V 3/38 702/6 |
| 2008/0221800 A1* | 9/2008 | Gladkikh | G01V 5/04 702/11 |

(Continued)

FOREIGN PATENT DOCUMENTS

| | | | |
|---|---|---|---|
| EP | 2300965 B1 * | 10/2019 | G05B 13/0275 |
| WO | WO-2018208634 A1 * | 11/2018 | G01V 1/306 |

OTHER PUBLICATIONS

Kuhn, Max et al., Applied Predictive Modeling, Springer, Sep. 2013, pp. 1-615 (Year: 2013).*
(Continued)

*Primary Examiner* — Jeffrey P Aiello
(74) *Attorney, Agent, or Firm* — Conley Rose, P. C.; Grant Rodolph; Jonathan K. Polk

(57) ABSTRACT

A method comprises performing data pre-processing of initial signals to obtain pre-processed initial signals; building a first machine learning model based on the pre-processed initial signals; generating output signals using the first machine learning model; computing ranks of the output signals; computing classifications of the output signals; and building a set of stacked machine learning models based on the ranks and the classifications. The set of stacked machine learning models may be used to generate subsurface well log data, NMR data, or other data.

22 Claims, 12 Drawing Sheets

Related U.S. Application Data

(60) Provisional application No. 62/702,176, filed on Jul. 23, 2018.

(58) Field of Classification Search
CPC .... G06F 16/2477; G06F 16/285; G06F 17/18; G16B 40/20; G16B 40/30
USPC ........ 702/6, 11, 14, 27, 76, 188–189; 703/2; 706/12, 15, 20
See application file for complete search history.

(56) References Cited

U.S. PATENT DOCUMENTS

| | | | |
|---|---|---|---|
| 2010/0088076 A1* | 4/2010 | Koutsabeloulis | E21B 43/00 703/2 |
| 2016/0157446 A1* | 6/2016 | Bentwich | G06F 3/04886 700/284 |
| 2018/0031732 A1* | 2/2018 | Mosse | G01V 11/00 |
| 2018/0322393 A1* | 11/2018 | Pau | G06N 3/0445 |
| 2019/0087939 A1* | 3/2019 | Hakimuddin | G06V 10/40 |
| 2019/0114545 A1* | 4/2019 | Lee | G06N 3/08 |

OTHER PUBLICATIONS

Bishop, Christopher M., "Neural Networks: A Pattern Recognition Perspective"; Technical Report: NCRG/96/001; Neural Computing Research Group; Birmingham, UK; Jan. 1996; 23 pages.

Brovko, Alexander V., et al.; "Waveguide Microwave Imaging: Neural Network Reconstruction of Functional 2-D Permittivity Profiles"; IEEE Transactions on Microwave Theory and Techniques; vol. 57, No. 2; Feb. 2009; 9 pages.

Chamjangali, M. Arab, et al.; "Prediction of Cytotoxicity Data (CC50) of Anti-HIV 5-Pheny-I-phenylamino-1H-imidazole Derivatives by Artificial Neural Network Trained with Levenberg-Marquardt Algorithm"; Journal of Molecular Graphics and Modelling; vol. 26; Jan. 18, 2007; 8 pages.

Chen, Q., et al.; "An Artificial Nerve Network Realization in the Measurement of Material Permittivity"; Progress In Electromagnetics Research; vol. 116; 2011; 15 pages.

Cheng, Chun-Tian, et al.; "Long-Term Prediction of Discharges in Manwan Hydropower Using Adaptive-Network-Based Fuzzy Inference Systems Models"; International Symposium on Neural Networks; 2005; 10 pages.

Ganapathi, Archana Sulochana, et al.; "Statistic-Driven Workload Modeling for the Cloud"; Technical Report No. UCB/EECS-2009-160; Electrical Engineering and Computer Sciences, University of California at Berkeley; Nov. 30, 2009; 8 pages.

Genty, Coralie; "Distingushing Carbonated Reservoir Pore Facies with Nuclear Magnetic Resonance as an Aid to Identify Candidates for Acid Stimulation"; Texas A&M University; Aug. 2006; 106 pages.

Han, Yifu, et al.; "Dielectric Dispersion Log Interpretation in Bakken Petroleum System"; SPWLA 58th Annual Logging Symposium; Jun. 17-21, 2017; 12 pages.

Han, Yifu, et al.; "Joint Petrophysical Inversion of Multifrequency Conductivity and Permittivity Logs Derived from Subsurface Galvanic, Induction, Propagation, and Dielectric Dispersion Measurements"; Geophysics; vol. 83, No. 3; May-Jun. 2018; 16 pages.

Hasan, Azhar, et al.; "Measurement of Complex Permittivity using Artificial Neural Networks"; IEEE Antennas and Propagation Magazine; vol. 53, No. 1; Feb. 2011; 4 pages.

Hizem, Mehdi, et al.; "Dielectric Dispersion: A New Wireline Petrophysical Measurement"; SPE Annual Technical Conference and Exhibition; SPE 116130; 2008; 21 pages.

Ko, Wai L., et al.; "Conductivity Estimation by Neural Network"; IEEE Antennas and Propagation Society International Symposium, AP-S Digest; vol. 4; Jun. 1995; 4 pages.

Kuhn, Max, et al.; "Applied Predictive Modeling"; Springer; 2013; 615 pages.

Li, Hao, et al.; "Prediction of Subsurface NMR T2 Distribution from Formation Mineral Composition Using Variational Autoencoder"; SEG International Exposition and 87th Annual Meeting; 2017; 5 pages.

Li, Hao, et al.; "Prediction of Subsurface NMR T2 Distributions in a Shale Petroleum System Using Variational Autoencoder-Based Neural Networks"; IEEE Geoscience and Remote Sensing Letters; vol. 14, No. 12; Dec. 2017; 3 pages.

McNeal, Robert P.; "Hydrodynamics of the Permian Basin"; Fluids in Subsurface Environments; 1965; 19 pages.

Paul, Siny, et al.; "A Neural Network Model for Predicting the Dielectric Permittivity of Epoxy-Aluminum Nanocomposite and Its Experimental Validation"; IEEE Transactions on Components, Packaging and Manufacturing Technology; vol. 5, No. 8; Aug. 2015; 7 pages.

Ronghua, Ji, et al.; "Prediction of Soil Moisture with Complex-Valued Neural Network"; IEEE Control and Decision Conference (CCDC); May 2017; 6 pages.

Simpson, Gary A., et al.; "Using Advanced Logging Measurements to Develop a Robust Petrophysical Model for the Bakken Petroleum System"; SPWLA 56th Annual Logging Symposium; Long Beach California; Jul. 18-22, 2015; 32 pages.

Tathed, Pratiksha, et al.; "Hydrocarbon Saturation in Upper Wolfcamp Shale Formation"; Fuel; vol. 219; 2018; 14 pages.

Vapnik, Vladimir N.; "The Nature of Statistical Learning Theory"; Second Edition; Springer; 2013, 334 pages.

Xing, Eric P., et al.; "Feature Selection for High-Dimensional Genomic Microarray Data"; International Conference on Machine Learning; 2001; 8 pages.

Yang Chih-Chung, et al.; "Landmine Detection and Classification with Complex-Valued Hybrid Neural Network Using Scattering Parameters Dataset"; IEEE Transactions on Neural Networks; vol. 16, No. 3; May 2005; 11 pages.

\* cited by examiner

SYNTHESIS OF SEQUENTIAL, SPECTRAL, AND TIME-SERIES DATA

CROSS-REFERENCE TO RELATED APPLICATIONS

This application is a continuation-in-part application of U.S. patent application Ser. No. 16/520,323 filed on Jul. 23, 2019 by The Board of Regents of the University of Oklahoma and titled "Synthesis of Sequential, Spectral, and Time-Series Data Using Signal Ranks, Stacked Models, and Signal Classifications," which claims priority to U.S. provisional patent application No. 62/702,176 filed on Jul. 23, 2018 by The Board of Regents of the University of Oklahoma and titled "Synthesis of Sequential, Spectral, and Time-Series Data Using Signal Ranks, Stacked Models, and Signal Classifications," which are incorporated by reference.

STATEMENT REGARDING FEDERALLY SPONSORED RESEARCH OR DEVELOPMENT

Not applicable.

BACKGROUND

Material analyses are important tools in many industries. Material analyses help determine types, characterizations, properties, and positions of those materials, as well as what substances and how much of those substances are in those materials. The properties include spatial features, internal arrangements, compositions, structures, distributions, and temporal changes. It is desirable to conduct material analyses in a cost-effective and operationally-convenient manner in the absence of the infrastructure needed to directly perform those material analyses. As a result, significant research is directed to reducing costs of material analyses, as well as improving materials analyses with an emphasis on reducing operational challenges.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
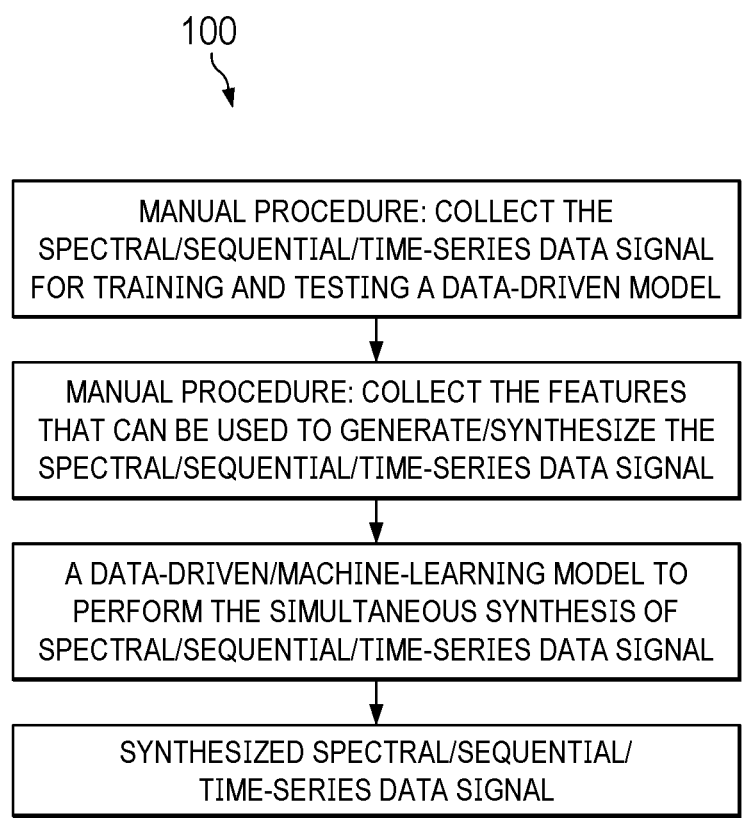
FIG. 1 is a flowchart of a method for simultaneous synthesis of entire sequential/spectral/time-series data using one data-driven model.

Sequential data comprise samples collected in an order, such as in order of time, energy, frequency, or any other sample index. Both time-series and spectral data are types of sequential data. DNA sequence, speech, sensor, text, oil/gas well production, and subsurface well log data are examples of sequential data. With the advances in data collection and storage technologies, sequential data is becoming ubiquitous in a wide spectrum of application scenarios. The methods and apparatuses disclosed herein can be used to synthesize sequential data for applications in bioinformatics, speech recognition, image recognition, econometrics, healthcare, behavioral studies, manufacturing, web analytics, credit card transactions, and social networking. Time-series data is used for forecasting in various industries. The methods and apparatuses disclosed herein can be used to synthesize time-series data to aid economic forecasting, earthquake forecasting, financial forecasting, stock market prediction, hydrocarbon production forecasting, sales forecasting, and weather forecasting. Spectral data are generated due to the interaction of electromagnetic radiations or nuclear particles with material. Spectral data are used by industries requiring material characterization in laboratory conditions or in field conditions, e.g., subsurface boreholes. The methods and apparatuses disclosed herein can be used to synthesize spectral data to aid biomedical imaging, composite monitoring, infrared measurements, structural health monitoring, subsurface geological characterization, well log analysis, geomaterial characterization, and chemical analysis.

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

The following abbreviations apply:
ANN: artificial neural network
ASIC: application-specific integrated circuit AT10: 10-inch
AT90: 90-inch
CPU: central processing unit
DD: dielectric dispersion
DPHZ: density porosity
DSP: digital signal processor
DTCO: delta-T compressional
DTSM: delta-T shear
EO: electrical-to-optical
FPGA: field-programmable gate array
ft: foot, feet
GHz: gigahertz
GR: gamma ray
kNN: k-nearest neighbor
MHz: megahertz
NMR: nuclear magnetic resonance
NPOR: neutron porosity
NRMSE: normalized root-mean-square error
OE: optical-to-electrical
PEFZ: photoelectric factor
RAM: random-access memory
RF: radio frequency
RHOZ: standard resolution formation density
ROM: read-only memory
RX: receiver unit
R2: coefficient of determination
SNN: stacked neural network
SRAM: static RAM
TCAM: ternary content-addressable memory
TX: transmitter unit
VCL: volume of clay layer.

Before describing various embodiments of the present disclosure in more detail by way of exemplary description, examples, and results, it is to be understood as noted above that the present disclosure is not limited in application to the details of methods and apparatus as set forth in the following description. The present disclosure is capable of other embodiments or of being practiced or carried out in various ways. As such, the language used herein is intended to be given the broadest possible scope and meaning; and the embodiments are meant to be exemplary, not exhaustive. Also, it is to be understood that the phraseology and terminology employed herein is for the purpose of description and should not be regarded as limiting unless otherwise indicated as so. Moreover, in the following detailed description, numerous specific details are set forth in order to provide a more thorough understanding of the disclosure. However, it will be apparent to a person having ordinary skill in the art that the embodiments of the present disclosure may be practiced without these specific details. In other instances, features which are well known to persons of ordinary skill in the art have not been described in detail to avoid unnecessary complication of the description.

Unless otherwise defined herein, scientific and technical terms used in connection with the present disclosure shall have the meanings that are commonly understood by those having ordinary skill in the art. Further, unless otherwise required by context, singular terms shall include pluralities and plural terms shall include the singular.

All patents, published patent applications, and non-patent publications mentioned in the specification are indicative of the level of skill of those skilled in the art to which the present disclosure pertains. All patents, published patent applications, and non-patent publications referenced in any portion of this application are herein expressly incorporated by reference in their entirety to the same extent as if each individual patent or publication was specifically and individually indicated to be incorporated by reference.

As utilized in accordance with the methods and apparatus of the present disclosure, the following terms, unless otherwise indicated, shall be understood to have the following meanings:

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or when the alternatives are mutually exclusive, although the disclosure supports a definition that refers to only alternatives and "and/or." The use of the term "at least one" will be understood to include one as well as any quantity more than one, including but not limited to, 2, 3, 4, 5, 6, 7, 8, 9, 10, 15, 20, 30, 40, 50, 100, or any integer inclusive therein. The term "at least one" may extend up to 100 or 1000 or more, depending on the term to which it is attached; in addition, the quantities of 100/1000 are not to be considered limiting, as higher limits may also produce satisfactory results. In addition, the use of the term "at least one of X, Y and Z" will be understood to include X alone, Y alone, and Z alone, as well as any combination of X, Y and Z.

As used herein, all numerical values or ranges include fractions of the values and integers within such ranges and fractions of the integers within such ranges unless the context clearly indicates otherwise. Thus, to illustrate, reference to a numerical range, such as 1-10 includes 1, 2, 3, 4, 5, 6, 7, 8, 9, 10, as well as 1.1, 1.2, 1.3, 1.4, 1.5, etc., and so forth. Reference to a range of 1-50 therefore includes 1, 2, 3, 4, 5, 6, 7, 8, 9, 10, 11, 12, 13, 14, 15, 16, 17, 18, 19, 20, etc., up to and including 50, as well as 1.1, 1.2, 1.3, 1.4, 1.5, etc., 2.1, 2.2, 2.3, 2.4, 2.5, etc., and so forth. Reference to a series of ranges includes ranges which combine the values of the boundaries of different ranges within the series. Thus, to illustrate reference to a series of ranges, for example, of 1-10, 10-20, 20-30, 30-40, 40-50, 50-60, 60-75, 75-100, 100-150, 150-200, 200-250, 250-300, 300-400, 400-500, 500-750, 750-1,000, includes ranges of 1-20, 10-50, 50-100, 100-500, and 500-1,000, for example. A reference to degrees such as 1 to 90 is intended to explicitly include all degrees in the range.

As used herein, the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AAB, BBC, AAABCCCC, CBBAAA, CABABB, and so forth. The skilled artisan will understand that typically there is no limit on the number of items or terms in any combination, unless otherwise apparent from the context.

Throughout this application, the terms "about" or "approximately" are used to indicate that a value includes the inherent variation of error. Further, in this detailed description, each numerical value (e.g., temperature, time, mass, volume, concentration, etc.) should be read once as modified by the term "about" (unless already expressly so modified), and then read again as not so modified unless otherwise indicated in context. As noted above, any range listed or described herein is intended to include, implicitly or explicitly, any number within the range, particularly all integers, including the end points, and is to be considered as having been so stated. For example, "a range from 1 to 10" is to be read as indicating each possible number, particularly integers, along the continuum between about 1 and about 10. Thus, even if specific data points within the range, or even no data points within the range, are explicitly identified or specifically referred to, it is to be understood that any data points within the range are to be considered to have been specified, and that the inventors possessed knowledge of the entire range and the points within the range. Unless otherwise stated, the term "about" or "approximately", where used herein when referring to a measurable value such as an amount, length, thickness, a temporal duration, and the like, is meant to encompass, for example, variations of ±20% or ±10%, or ±5%, or ±1%, or ±0.1% from the specified value, as such variations are appropriate to perform the disclosed methods and as understood by persons having ordinary skill in the art.

As used herein, the term "substantially" means that the subsequently described parameter, event, or circumstance completely occurs or that the subsequently described parameter, event, or circumstance occurs to a great extent or degree. For example, the term "substantially" means that the subsequently described parameter, event, or circumstance occurs at least 90% of the time, or at least 91%, or at least 92%, or at least 93%, or at least 94%, or at least 95%, or at least 96%, or at least 97%, or at least 98%, or at least 99%, of the time, or means that the dimension or measurement is within at least 90%, or at least 91%, or at least 92%, or at least 93%, or at least 94%, or at least 95%, or at least 96%, or at least 97%, or at least 98%, or at least 99%, of the referenced dimension or measurement (e.g., length).

Disclosed herein are embodiments for synthesis of sequential, spectral, and time-series data. That data may be referred to as the target. The synthesis may use ranks of target elements, classifications of samples, and stacked data-driven models. The embodiments may comprise three connected devices: Device #1, Device #2, and Device #3. Device #1 assigns a rank to each discrete element/component of the target in the training dataset. Device #2 assigns a specific class/category to each sample/observation in the training and testing dataset or in the deployment dataset. Device #3 sequentially generates/synthesizes each element/component of the target by processing the features/attributes in the training and testing dataset or in the deployment dataset along with classes/categories determined by Device #2 and higher-ranked target elements, such that higher-ranked target elements are used to improve the synthesis of lower-ranked target elements. Alternatively, a single device or another combination of devices may implement the embodiments.

The target is a collection of several discrete elements/components that are a function of an independent parameter, such as frequency, time, or energy. The measurements/data that are processed for the desired synthesis of the target are referred as the features/attributes. The dataset used for developing the data-driven models implemented in the three connected devices is referred to as the training dataset. In general, a data-driven model learns from the training dataset to relate the features with targets. The dataset used for testing/evaluating the robustness/reliability of the newly developed data-driven models implemented in the three connected devices is referred to as the testing dataset. The performance of the data-driven model on the training dataset is compared against the testing dataset to assess model over-fitting or under-fitting. The training and testing datasets contain both the targets and the features for several samples/observations, which are referred to as training/testing samples.

During the training stage, Device #1 learns to assign a rank to each element constituting the target that leads to higher-ranked and lower-ranked target elements; Device #2 learns to assign a class to each sample based on the features/attributes of the training/testing samples; and Device #3 learns to process the features, classes, and higher-ranked target elements of the training samples to sequentially synthesize the lower-ranked target elements of the corresponding training samples, such that each element of the target is sequentially synthesized based on the ranking learned by Device #1. During the training stage, only the training dataset is processed to build the data-driven models implemented in the three connected devices. The data-driven models implemented in the devices first learn from the training dataset; following that, the trained models are evaluated on the testing dataset. If the data-driven models do not perform well on the testing dataset (i.e., the models under-fit or over-fit), the hyper-parameters of the data-driven models are tuned/modified to optimize the learning on the training dataset, so as to improve the subsequent evaluation of the models on the testing dataset.

After the training/testing of the data-driven models implemented in the devices, the devices are applied/deployed on the new, unseen dataset containing only features for which the target needs to be synthesized. Such a dataset is referred to as the deployment dataset, and this stage is referred as the deployment stage. The target comprises several discrete elements. The deployment dataset contains features without targets for several unseen, new samples referred to as the deployment samples. Device #2 and Device #3 process the deployment dataset to generate the desired target. Device #1 is not active in the deployment stage.

The disclosed embodiments process the training and testing datasets so that Device #1 learns to assign ranks, Device #2 learns to assign classes, and Device #3 learns to sequentially synthesize the spectral/sequential/time-series data signal based on the ranks determined by Device #1 while using classes determined by Device #2. During the deployment of the deployment dataset, Device #2 assigns classes to the deployment samples and Device #3 sequentially synthesizes the spectral/sequential/time-series data signal for the deployment samples based on the ranks identified by Device #1 while using the classes determined by Device #2.

Device #1 assigns a rank to each discrete element/component of the target. During the training/testing stage, Device #1 is fed the target of the training/testing samples. Device #1 then determines the ranks and memorizes the ranks of elements of the target of the training/testing samples. During the deployment stage, Device #1 is not fed anything because of the absence of a target, and Device #1 assigns the ranks that were learned and memorized during the training/testing stage. To rank each discrete element/component of the spectral/sequential/time-series data signal, Device #1 may: (1) develop a data-driven model on the training and testing dataset to simultaneously generate all the target elements (i.e., the entire target); (2) quantify the accuracy of simultaneously generating each target element on the testing dataset; (3) assign a rank to each target element based on the accuracy of simultaneous synthesis, such that the target elements that were synthesized at high accuracy are assigned a higher rank; and (4) use the ranking identified using the training and testing dataset on the deployment dataset. Device #1 can implement other methods to assign the ranks.

Device #2 assigns a class to each sample in the dataset. During the training/testing stage, Device #2 is fed only the features of the training/testing samples and certain corresponding labels to learn the decision boundaries and classification strategies. Device #2 then determines the classes of the training/testing samples. During the deployment stage, Device #2 is fed only the features of the deployment samples, and Device #2 assigns the classes to the deployment samples based on the decision boundaries and classification strategies learned and memorized during the training/testing stage. To classify each sample, Device #2 may: (1) manually/automatically label the training and testing dataset based on certain criteria or thresholds for the features, (2) compute decision boundaries and classification strategies that accurately classify the training samples, (3) evaluate the decision boundaries and classification strategies on testing samples, and (4) use the decision boundaries and classification strategies learned from the training dataset on the deployment dataset. Device #2 can implement other methods to assign the ranks.

Device #3 implements stacked data-driven/machine-learning models (computational units arranged in series) to perform sequential data-driven modeling of each element of the target based on the ranks of the target elements assigned by Device #1. The target element ranks determine the architecture of the stacked data-driven/machine-learning models. Device #3 processes three items: (1) features, (2) previously generated or measured higher-ranked target elements (as assigned by Device #1) and (3) classes (assigned by Device #2) for accurate/improved synthesis of the lower-ranked target elements. To sequentially generate the target elements, starting from higher-ranked target element to lower-ranked target element, Device #3 may: use a stacked ANN architecture to sequentially synthesize spectral data comprising n discrete elements using n neural networks, starting with a highest-ranked spectral-data element and ending with a lowest-ranked spectral-data element, such that the i-th ANN model that synthesizes the i-th ranked spectral-data element is fed with all the previously synthesized or measured higher-ranked spectral-data elements (1 to i−1), all features, and the classes determined by the Device #2.

A computational data-processing unit ranks the individual elements of a spectral/sequential/time-series data signal based on the accuracy of simultaneous data-driven modeling of the entire target. A second computational data-processing unit assigns a class to each sample based on decision boundaries and classification strategies. A third computational data-processing unit performs sequential data-driven modeling of each element/component of the spectral/sequential/time-series data signal one by one using stacked data-driven or machine-learning models such that, during the generation/synthesis of a lower-ranked target element, all the previously generated or measured higher-ranked target elements are used along with the features and classes of the samples.

The embodiments facilitate the use of elements of a spectral/sequential/time-series target (i.e., output) and their derivatives for improving prediction/generation/synthesis of the overall spectral/sequential/time-series target. In doing so, the data-driven model for sequential synthesis of spectral/sequential/time-series signal receives extra information about target elements that is not made available to the data-driven model for simultaneous synthesis of the spectral/sequential/time-series signal.

In one implementation, the embodiments achieve a 10% overall improvement in the accuracy of neural network modeling of 8 discretely sampled dielectric spectral responses as a function of frequency such that, for some discrete samples, the improvement in the accuracy of the neural networking modeling is as high as 23%. The embodiments are not restricted to neural network modeling, and similar implementations can be achieved using other machine learning methods, such as support vector regression, random forest regression, Bayesian regression, or ordinary least-squares regression. For another implementation, the embodiments achieve a 15% improvement (in terms of R2 or R-squared) in overall synthesis of NMR T2 spectral data.

The embodiments can be incorporated in any spectral/sequential/time-series data generation, processing, manipulation, recognition, or assessment systems. Oil and gas, mining, non-destructive testing, and diagnostic imaging companies in the civil engineering, material science, electrical engineering, medical diagnosis, mechanical engineering, and geotechnical engineering fields rely on spectral/sequential/time-series data for characterization and may implement the embodiments for accurate material/subsurface characterization.

The embodiments were applied to 2200 ft depth-interval of an organic-rich shale formation to accurately synthesize DD logs acquired in a subsurface borehole environment. DD logs generally comprise 4 multi-frequency conductivity ($\sigma_{f0}$, $\sigma_{f1}$, $\sigma_{f2}$ and $\sigma_{f3}$) and 4 multi-frequency relative permittivity ($\varepsilon_{r,f0}$, $\varepsilon_{r,f1}$, $\varepsilon_{r,f2}$ and $\varepsilon_{r,f3}$) measurements at 4 distinct frequencies ($f_0$, $f_1$, $f_2$, and $f_3$). Consequently, a DD log is a spectral data, wherein conductivity and permittivity are measured as a function of frequency. DD logs generally span a frequency range from 10 MHz to 1 GHz. DD logs are sensitive to porosity, pore-filling fluid types and saturations, brine salinity, pore morphology, and polarization mechanisms. Salinity-independent water saturation in the subsurface formation is generally derived from the DD logs. The interpretation of frequency-dependence of DD logs sheds light on the polarization phenomena and various charge transport/accumulation/separation processes in the subsurface geological formations.

Acquisition of DD logs in subsurface formations is operationally challenging due to tool design, borehole size, wellbore deviation, and operating procedures and requires hard-to-deploy infrastructure. The embodiments comprise a stacked neural-network model (that processes conventional, easy-to-acquire subsurface logs to synthesize the DD logs. The embodiments are not restricted to neural network modeling, and similar implementations can be achieved using other data-driven/machine-learning models). An SNN model processed 15 easy-to-acquire, conventional subsurface logs to synthesize the DD logs, comprising 8 logs. The SNN architecture for synthesizing the 8 DD logs involved a two-step methodology requiring a total of nine neural networks. First, the 8 DD logs were ranked in order of the accuracy of synthesizing each DD log using only one neural network model that performed simultaneous synthesis of the 8 DD logs. Following that, a rank-based sequential synthesis of each of the 8 DD logs was performed using 8 distinct neural network models.

Performance of SNN-based DD log synthesis in terms of average NRMSE was 0.07 and 0.089 for the 4 multi-frequency conductivity-dispersion and the 4 multi-frequency permittivity-dispersion logs, respectively. In terms of NRMSE, an overall 10% improvement in log-synthesis performance was achieved by implementing a two-step log-synthesis methodology. The first step involved simultaneous synthesis of the 8 DD logs and then ranking the 8 DD logs based on the accuracy of synthesizing each of the 8 DD logs. The second step involved rank-based sequential synthesis of the 8 DD logs, one at time, using an SNN that processed higher-ranked DD logs along with features to sequentially generate the lower-ranked DD logs. The concept of using measurements or synthesis of higher-ranked DD logs (target elements) to improve the accuracy of synthesizing lower-ranked DD logs (target elements) and the concept of performing sequential synthesis of the 8 DD logs based on a predetermined ranking disrupts the currently available technologies.

Lower accuracy of data-driven modeling methods under the constraints of poor data quality and limited data quantity is a genuine problem. The embodiments provide a workflow/method to improve the accuracy of data-driven modeling of sequential/spectral/time-series data. The embodiments improve data-driven modeling of continuous/discrete sequential/spectral/time-series data by adopting rank-based sequential generation of sequential/spectral/time-series data using stacked data-driven models. Prior to the methods and apparatuses disclosed herein, the general trend was to simultaneously generate the entire sequential/spectral/time-series data using one data-driven model.

FIG. 1 is a flowchart of a method 100 for simultaneous synthesis of entire sequential/spectral/time-series data using one data-driven model. The method 100 does not comprise rank-based sequential generation of data.

Figure 2:
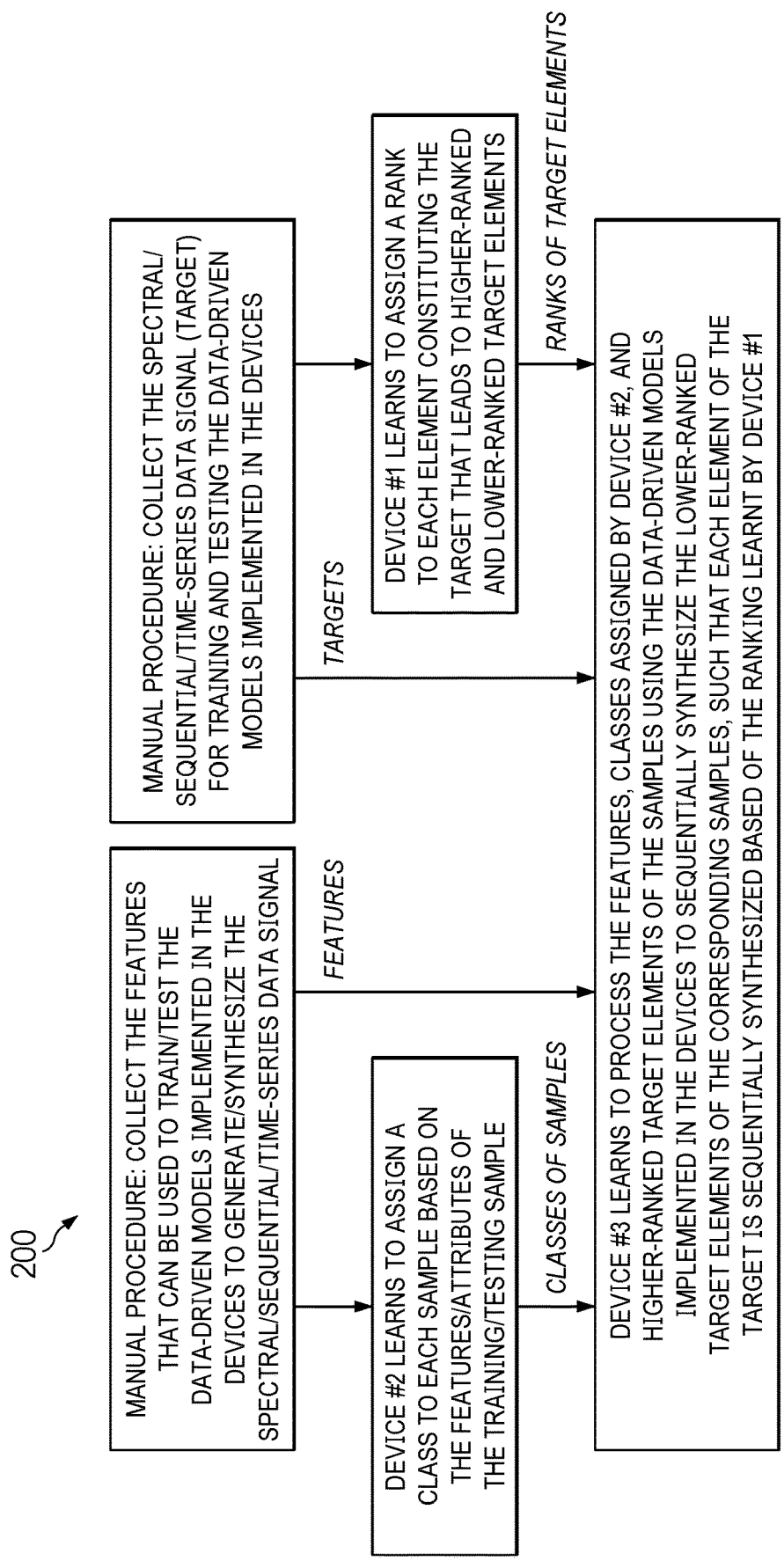
FIG. 2 is a flowchart of a method for training/testing data-driven models implemented in the devices for rank-based sequential synthesis of continuous/discrete sequential/spectral/time-series data.

FIG. 2 is a flowchart of a method 200 for training/testing data-driven models implemented in the devices for rank-based sequential synthesis of continuous/discrete sequential/spectral/time-series data.

Figure 3:
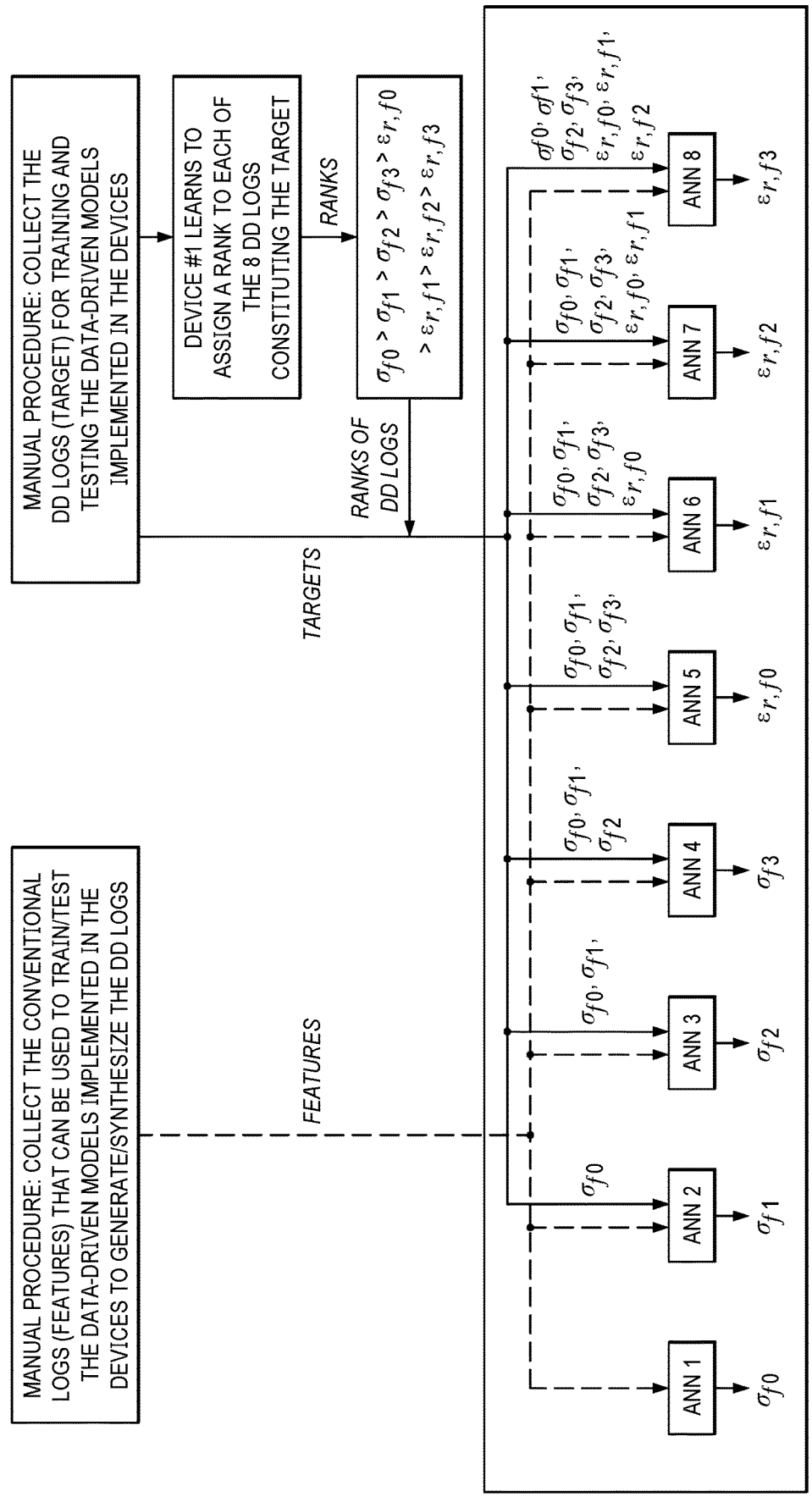
FIG. 3 is a flowchart of a method for rank-based sequential synthesis of 8 DD logs.

FIG. 3 is a flowchart of a method 300 for rank-based sequential synthesis of 8 DD logs. The DD logs comprise 4 multi-frequency conductivity ($\sigma_{f0}$, $\sigma_{f1}$, $\sigma_{f2}$ and $\sigma_{f3}$) and 4 multi-frequency relative permittivity ($\varepsilon_{r,f0}$, $\varepsilon_{r,f1}$, $\varepsilon_{r,f2}$ and $\varepsilon_{r,f3}$) measurements at 4 distinct frequencies ($f_0$, $f_1$, $f_2$, and $f_3$), during the training/testing stage when the SNN is developed on the features and targets for training/testing samples. This example does not use Device #2 and the sample classes.

Figure 4:
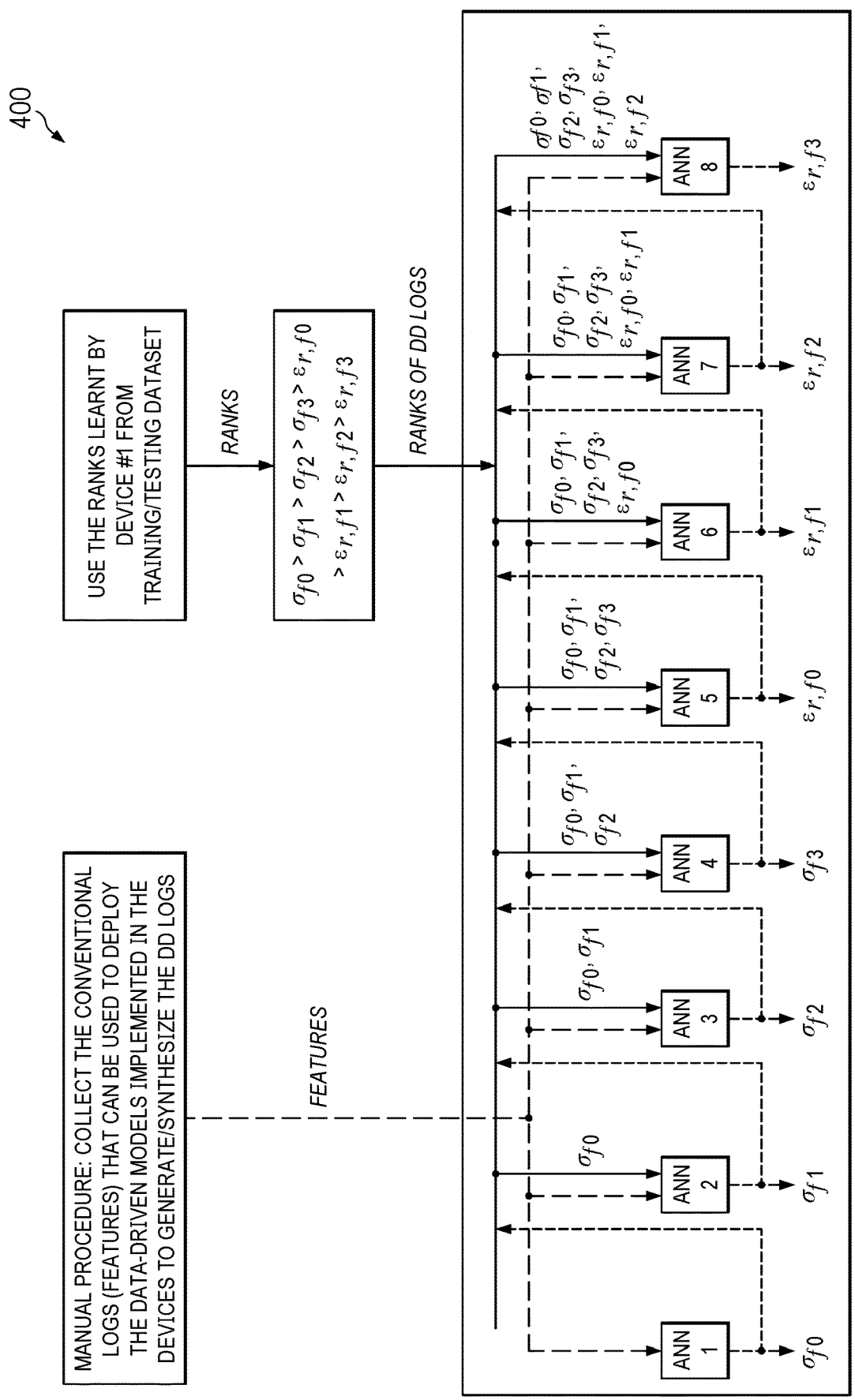
FIG. 4 is a flowchart of a method for rank-based sequential synthesis of the 8 DD logs during the deployment stage when the SNN processes the features for new, unseen deployment samples to generate the 8 DD logs.

FIG. 4 is a flowchart of a method 400 for rank-based sequential synthesis of the 8 DD logs during the deployment stage when the SNN processes the features for new, unseen deployment samples to generate the 8 DD logs. This example does not use Device #2 and the sample classes.

Figure 5:
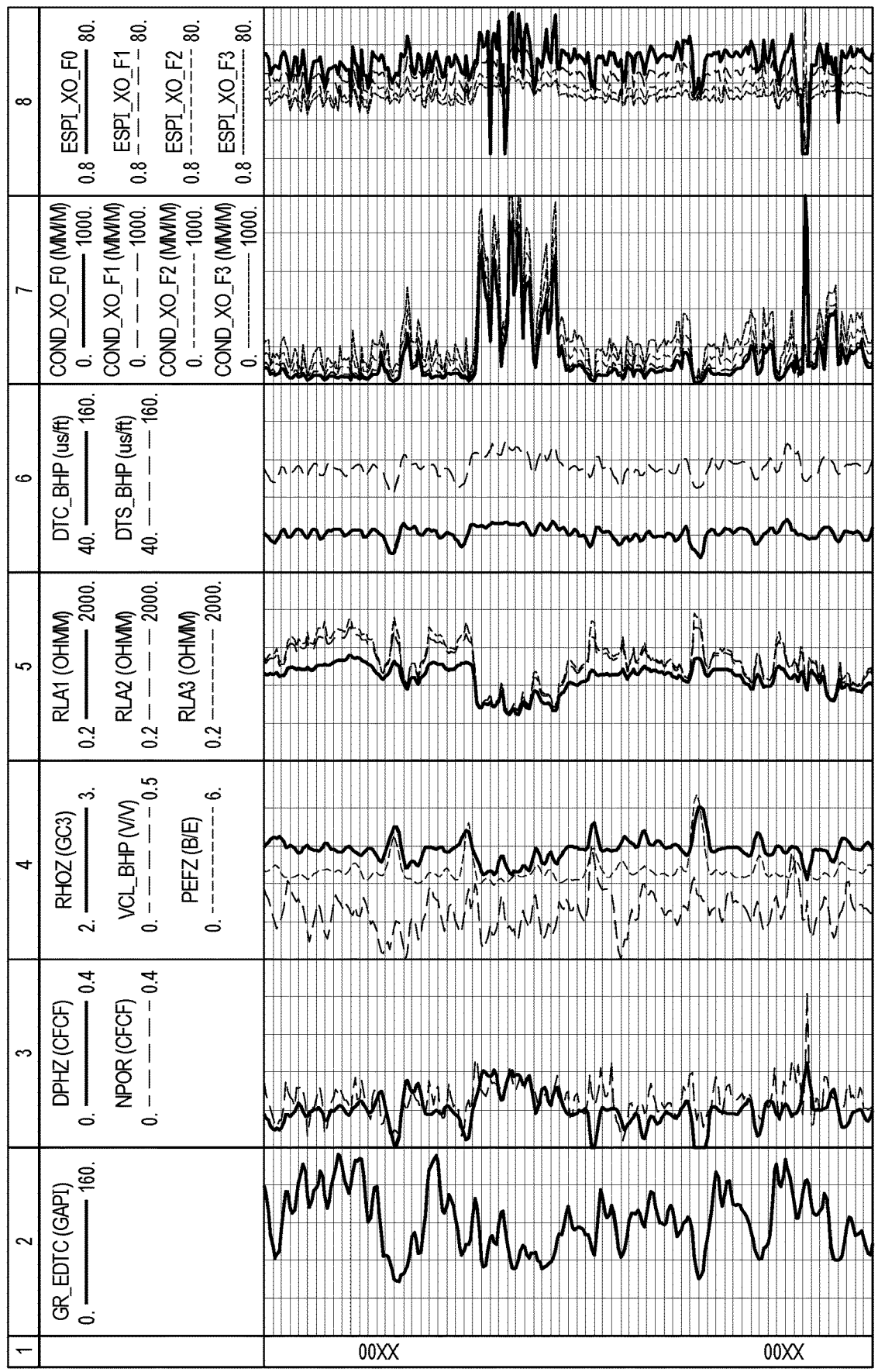
FIG. 5 is a graph of various logs used for the example related to synthesis of DD logs using the disclosed embodiments.

FIG. 5 is a graph 500 of various logs used for the example related to synthesis of DD logs using the disclosed embodiments. Track 1 is depth; Track 2 is gamma ray log; Track 3 contains density porosity and neutron porosity logs; Track 4 contains formation photoelectric factor, bulk density, and volume of clay logs; Track 5 is laterolog resistivity logs at 3 depths of investigation (RLA1, RLA2, RLA3); Track 6 contains DTC and DTS logs; Track 7 comprises 4 shallow conductivity dispersion logs ($\sigma_{f0}$, $\sigma_{f1}$, $\sigma_{f2}$ and $\sigma_{f3}$) from the dielectric dispersion spectroscopy tools; and Track 8 comprises 4 shallow relative permittivity dispersion logs ($\varepsilon_{r,f0}$, $\varepsilon_{r,f1}$, $\varepsilon_{r,f2}$ and $\varepsilon_{r,f3}$) measured using the dielectric dispersion spectroscopy tools. Data/Signals in Tracks 1 to 5 are used as features for the data-driven modeling of the 8 DD Logs listed in Tracks 6 and 7 using the methods 200, 300, and 400.

Figure 6:
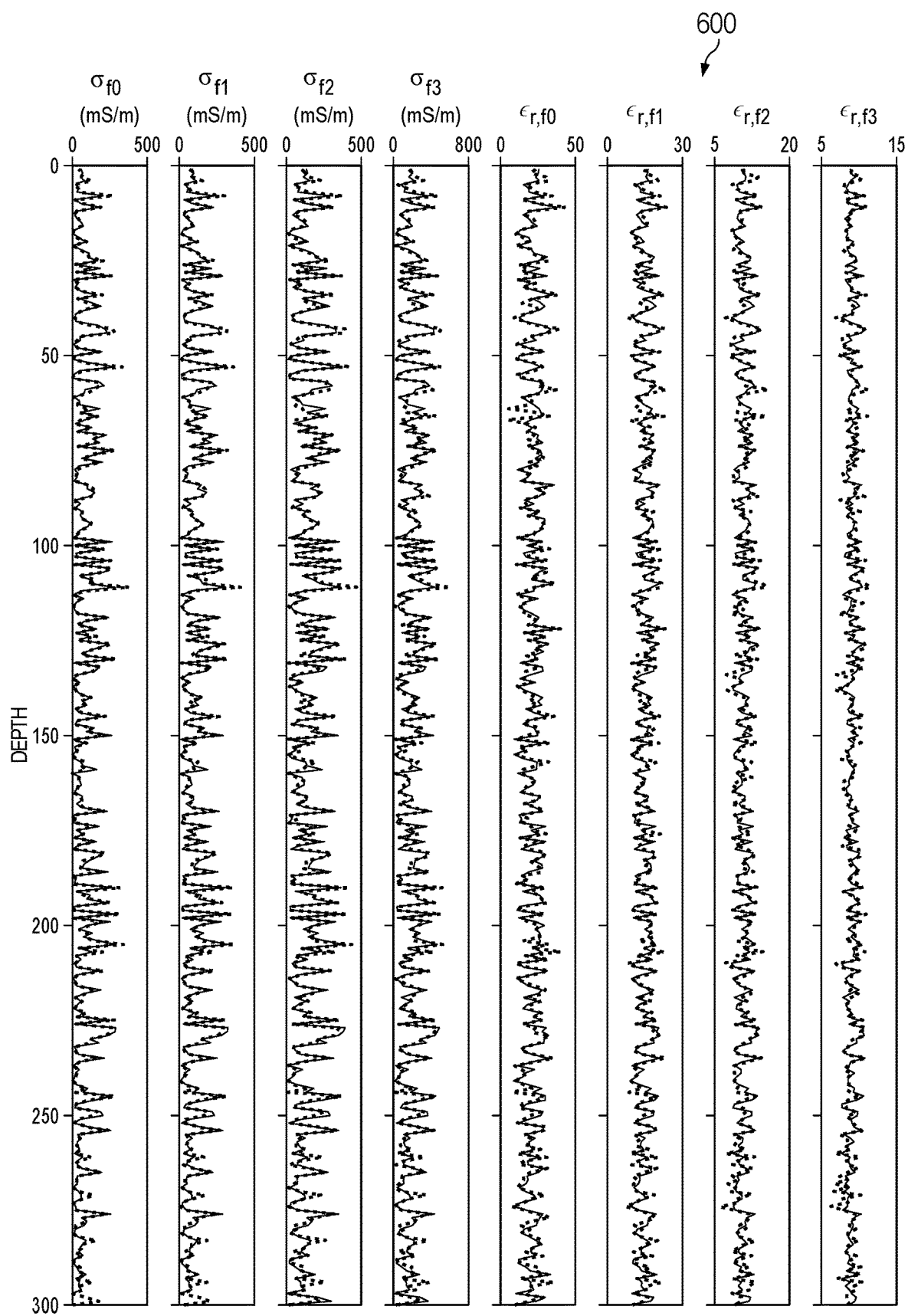
FIG. 6 is a graph comparing the 8 original (dashed) dielectric dispersion logs with those synthesized (solid) using the methods in FIGS. 2-4 for a testing dataset in Well 1.

FIG. 6 is a graph 600 comparing the 8 original (dashed) dielectric dispersion logs with those synthesized (solid) using the methods 200, 300, and 400 in FIGS. 2-4 for a testing dataset in Well 1.

Table 1 shows results comparing the accuracy of synthesizing each element of DD logs in Well 1 and Well 2 using the method 100 in FIG. 1 involving simultaneous synthesis of all target elements.

TABLE 1

| | | NRMSE | | | |
|---|---|---|---|---|---|
| | | f0 | f1 | f2 | f3 |
| Well 1 | Conductivity | 0.063 | 0.075 | 0.086 | 0.093 |
| Second Method | Permittivity | 0.095 | 0.090 | 0.088 | 0.090 |
| Well 2 | Conductivity | 0.078 | 0.084 | 0.102 | 0.111 |
| Second Method | Permittivity | 0.119 | 0.144 | 0.136 | 0.140 |

Table 2 shows results comparing the accuracy of synthesizing each element of DD logs in Well 1 and Well 2 using the methods 200, 300, and 400 in FIGS. 2-4. The methods 200, 300, and 400 use rank-based sequential synthesis of target elements one at a time using an SNN that processes higher-ranked DD logs along with features to sequentially generate the lower-ranked DD logs.

TABLE 2

| | | NRMSE | | | |
|---|---|---|---|---|---|
| | | f0 | f1 | f2 | f3 |
| Well 1 | Conductivity | 0.067 | 0.066 | 0.071 | 0.077 |
| Second Method | Permittivity | 0.093 | 0.088 | 0.089 | 0.086 |
| Well 2 | Conductivity | 0.072 | 0.077 | 0.094 | 0.105 |
| Second Method | Permittivity | 0.118 | 0.139 | 0.129 | 0.138 |

A comparison of Table 1 and Table 2 demonstrates the improvements in synthesizing each target element due to the ranked-based sequential synthesis using a stacked data-driven model, as shown in the methods 300 and 400. The embodiments improve data-driven modeling of continuous/discrete sequential/spectral/time-series data by adopting rank-based sequential generation of sequential/spectral/time-series data using stacked data-driven models, which is elaborated in the methods 200, 300, and 400. Previously, the general trend was to simultaneously generate the entire sequential/spectral/time-series data using one data-driven model as in the method 100.

Table 3 lists the ranks assigned to the target elements by Device #1 based on the accuracy of synthesizing each target element when simultaneously synthesizing the target elements using one data-driven model. In this example, the target elements are conductivity and permittivity at 4 frequencies. The accuracy is based on the inverse of NRMSE and is directly proportional to $R^2$. Device #1 can implement other methods to assign the ranks.

TABLE 3

| | $\sigma_{f0}$ | $\sigma_{f1}$ | $\sigma_{f2}$ | $\sigma_{f3}$ | $\varepsilon_{r,f0}$ | $\varepsilon_{r,f1}$ | $\varepsilon_{r,f2}$ | $\varepsilon_{r,f3}$ |
|---|---|---|---|---|---|---|---|---|
| $R^2$ | 0.92 | 0.90 | 0.88 | 0.84 | 0.66 | 0.68 | 0.62 | 0.57 |
| NRMSE | 0.063 | 0.070 | 0.078 | 0.093 | 0.095 | 0.104 | 0.104 | 0.105 |
| Ranking | 1 | 2 | 3 | 4 | 5 | 6 | 7 | 8 |

Table 4 shows results demonstrating improvement in the DD log synthesis due to implementation of the methods 200, 300, and 400 in FIGS. 2-4 as compared to the method 100 in FIG. 1.

TABLE 4

|  | $\sigma_{f0}$ | $\sigma_{f1}$ | $\sigma_{f2}$ | $\sigma_{f3}$ | $\varepsilon_{r,f0}$ | $\varepsilon_{r,f1}$ | $\varepsilon_{r,f2}$ | $\varepsilon_{r,f3}$ |
|---|---|---|---|---|---|---|---|---|
| Improvement (%) | 1.47 | 9.59 | 10.13 | 11.49 | −2.2 | 9.28 | 9.18 | 23.21 |

During the sequential generation of lower-ranked DD logs in FIGS. 3 and 4, each of the 8 DD logs is predicted one at a time using 8 distinct ANN models that process the conventional logs and all the previously predicted or measured higher-ranked DD logs as inputs. For example, ANN model #1 in FIGS. 3 and 4 generates the highest-ranked $\sigma_{f0}$ by processing the 15 conventional logs as features. Following the generation of $\sigma_{f0}$, ANN model #2 generates the second-ranked $\sigma_{f1}$ by processing the 15 conventional logs and predicted $\sigma_{f0}$ as features. The rest of the lower-ranked DD logs are generated in the similar manner, such that finally the lowest-ranked $\varepsilon_{r,f3}$ is generated by ANN model #8 that processes the 15 conventional logs and the 7 previously generated DD logs, namely $\sigma_{f0}$, $\sigma_{f1}$, $\sigma_{f2}$, $\sigma_{f3}$, $\varepsilon_{r,f0}$, $\varepsilon_{r,f1}$, and $\varepsilon_{r,f2}$. This rank-based sequential DD log synthesis method improves the overall DD log synthesis accuracy in generating the 8 DD logs to 0.637 (Table 2) in terms of NRMSE, which marks a 9.6% relative change with respect to simultaneous DD log synthesis (Table 1) accuracy of 0.7 in terms of NRMSE. For the one-step simultaneous DD log synthesis, $\varepsilon_{r,f2}$ and $\varepsilon_{r,f3}$ were generated at the highest inaccuracies of 0.098 and 0.112 in terms of NRMSE, respectively. When performing the rank-based DD log synthesis, the NRMSE for $\varepsilon_{r,f2}$ and $\varepsilon_{r,f3}$ were lowered to 0.089 and 0.086, respectively, which correspond to relative changes in prediction accuracies of 9.8% and 23.21%, respectively (Table 4). Overall performance of the SNN model in synthesizing the conductivity dispersions is better than that for permittivity dispersions by 0.2.

For purposes of demonstration of the disclosed embodiment, DD logs were acquired in shale formation at four discrete frequencies: 20 MHz, 100 MHz, 300 MHz and 1 GHz. The method 100 implements an ANN model that processes conventional log data to simultaneously synthesize the 8 DD logs, namely four conductivity and four relative permittivity logs at four discrete frequencies in the range of 10 MHz to 1 GHz. The methods 200, 300, and 400 involve a two-step process. In step 1, 4 conductivity and 4 permittivity logs are first ranked based on the accuracy of simultaneous synthesis. In step 2, after ranking the 8 DD logs, another 8 ANN models are implemented to sequentially generate the 8 dispersion logs one at a time, starting by synthesizing the log having the highest rank and ending by synthesizing the log having the lowest rank.

Due to the physics of charge polarization, conductivity is related to permittivity at each frequency, and the conductivity/permittivity at one frequency is related to conductivity/permittivity at another frequency. Such relationships are inherent in any dispersive property with a causal behavior. The SNN model architecture used in this study is designed to learn these physical relationships as a function of frequency and phase difference. The architecture of the methods 300 and 400 is designed to mimic these physical trends, and the methods 300 and 400 are based on the method 200, which is a significant advancement compared to the method 100. Instead of using an SNN architecture, the neural networks in the stacking can be replaced by other regressors, such as multivariate linear regressors, support vector regressors, Bayesian regressors, or random forest regressors.

Figure 7:
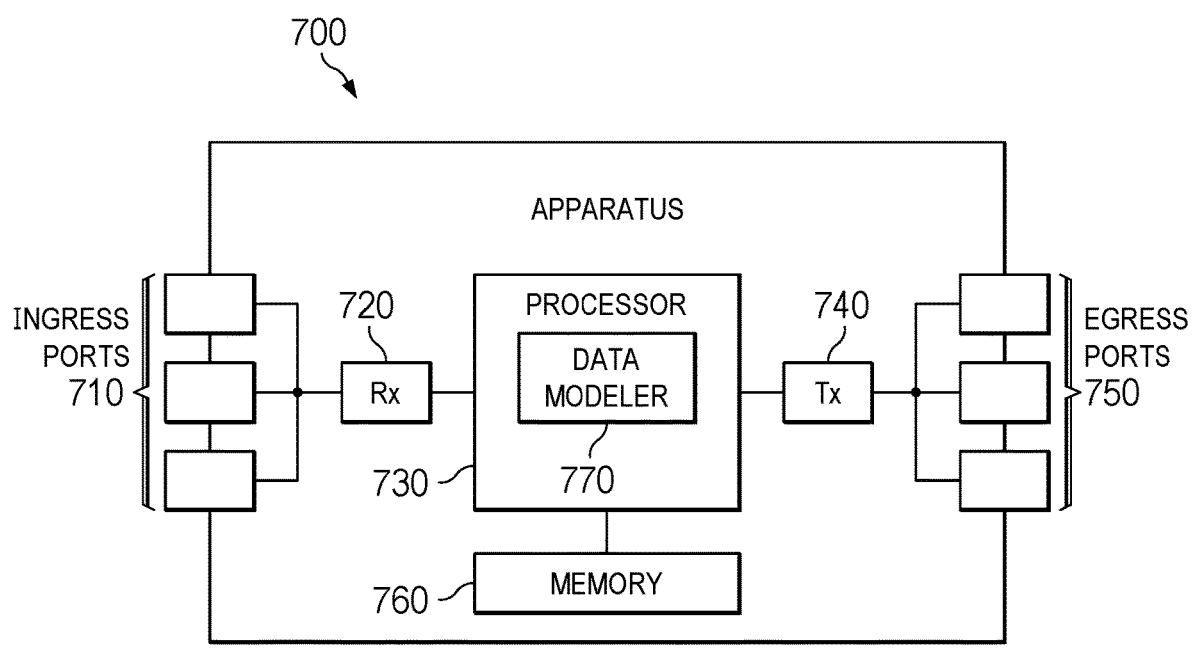
FIG. 7 is a schematic diagram of an apparatus according to an embodiment of the disclosure.

FIG. 7 is a schematic diagram of an apparatus 700 according to an embodiment of the disclosure. The apparatus 700 may implement the disclosed embodiments. The apparatus 700 comprises ingress ports 710 and an RX 720 for receiving data; a processor, logic unit, baseband unit, or CPU 730 to process the data; a TX 740 and egress ports 750 for transmitting the data; and a memory 760 for storing the data. The apparatus 700 may also comprise OE components, EO components, or RF components coupled to the ingress ports 710, the RX 720, the TX 740, and the egress ports 750 for ingress or egress of optical signals, electrical signals, or RF signals.

The processor 730 is any combination of hardware, middleware, firmware, or software. The processor 730 comprises any combination of one or more CPU chips, cores, FPGAs, ASICs, or DSPs. The processor 730 communicates with the ingress ports 710, the RX 720, the TX 740, the egress ports 750, and the memory 760. The processor 730 comprises a data modeler 770, which implements the disclosed embodiments. The inclusion of the data modeler 770 therefore provides a substantial improvement to the functionality of the apparatus 700 and effects a transformation of the apparatus 700 to a different state. Alternatively, the memory 760 stores the data modeler 770 as instructions, and the processor 730 executes those instructions.

The memory 760 comprises any combination of disks, tape drives, or solid-state drives. The apparatus 700 may use the memory 760 as an over-flow data storage device to store programs when the apparatus 700 selects those programs for execution and to store instructions and data that the apparatus 700 reads during execution of those programs. The memory 760 may be volatile or non-volatile and may be any combination of ROM, RAM, TCAM, or SRAM.

The use of Device #2 to learn and assign classes to samples is demonstrated. Following that, the classes along with features corresponding to various samples are processed by a stacked data-driven model for rank-based sequential synthesis of spectral/sequential/time-series data signal.

Figure 11:
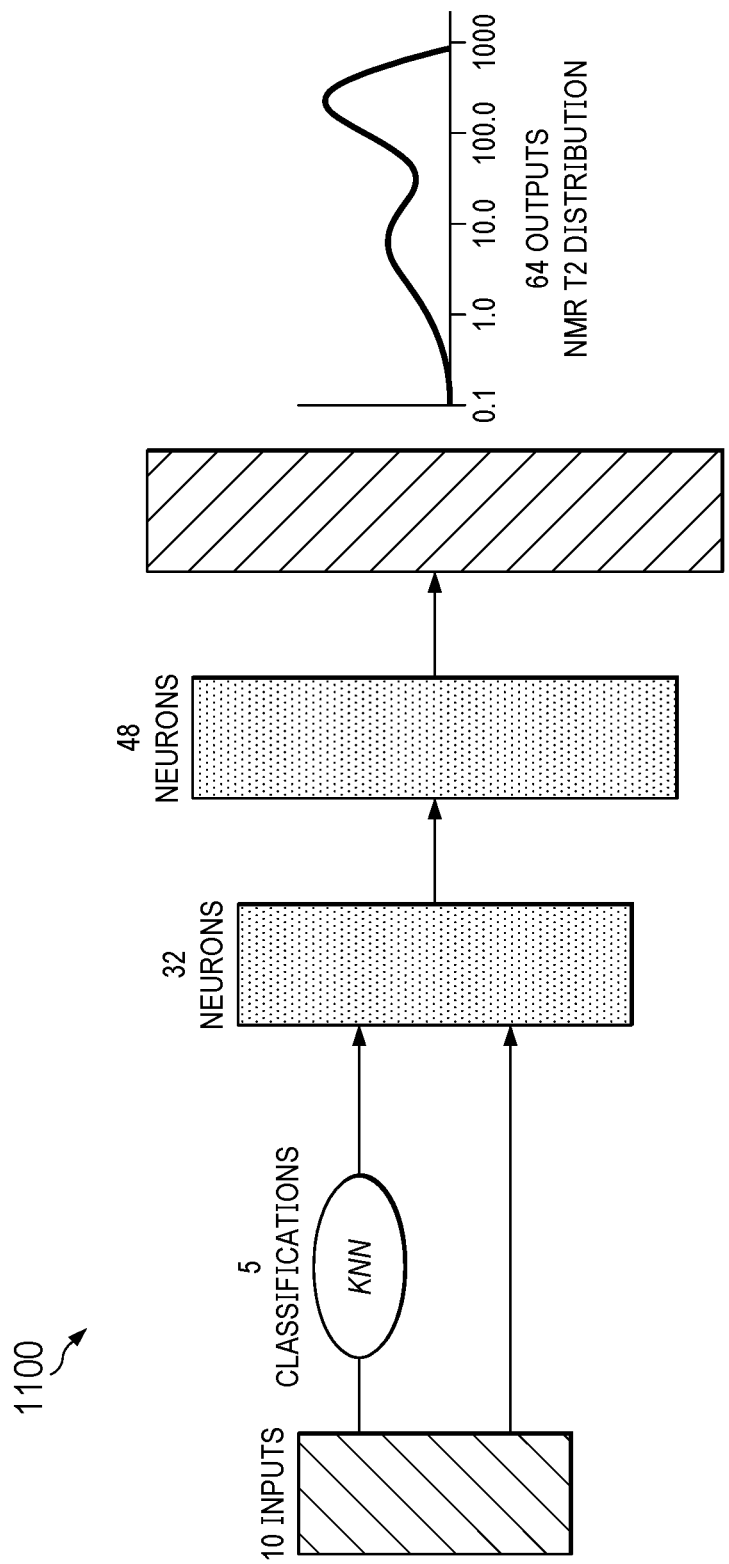
FIG. 11 is a diagram showing an implementation of a neural network with two hidden layers that process 10 conventional logs and 5 classes assigned by Device #2 to generate 64-dimensional NMR T2 spectral data.

For purposes of demonstration of improved synthesis when using classes, NMR T2 spectral data is synthesized by a stacked data-driven model that processes 10 conventional logs along with 5 classes assigned by kNN model implemented in Device #2. The NMR T2 spectral data comprise 64 T2 amplitudes measured as a function of T2 times. In one demonstration, a simple neural network model with two-hidden layers that processes the 5 classes assigned by kNN and 10 conventional logs was used to generate NMR T2 spectral data (FIG. 11).

The conventional logs being processed as features for the disclosed task include GR log sensitive to volumetric shale concentration, induction resistivity logs measured at AT10 and AT90 depths of investigation sensitive to the volumes of connate hydrocarbon and brine, NPOR and DPHZ logs that are influenced by the formation porosity, PEFZ log indicating the formation interval, VCL log measuring the volume of clay, RHOZ log sensitive to the formation density, and sonic logs, including DTSM and (DTCO, sensitive to the geomechanical properties.

Figure 8:
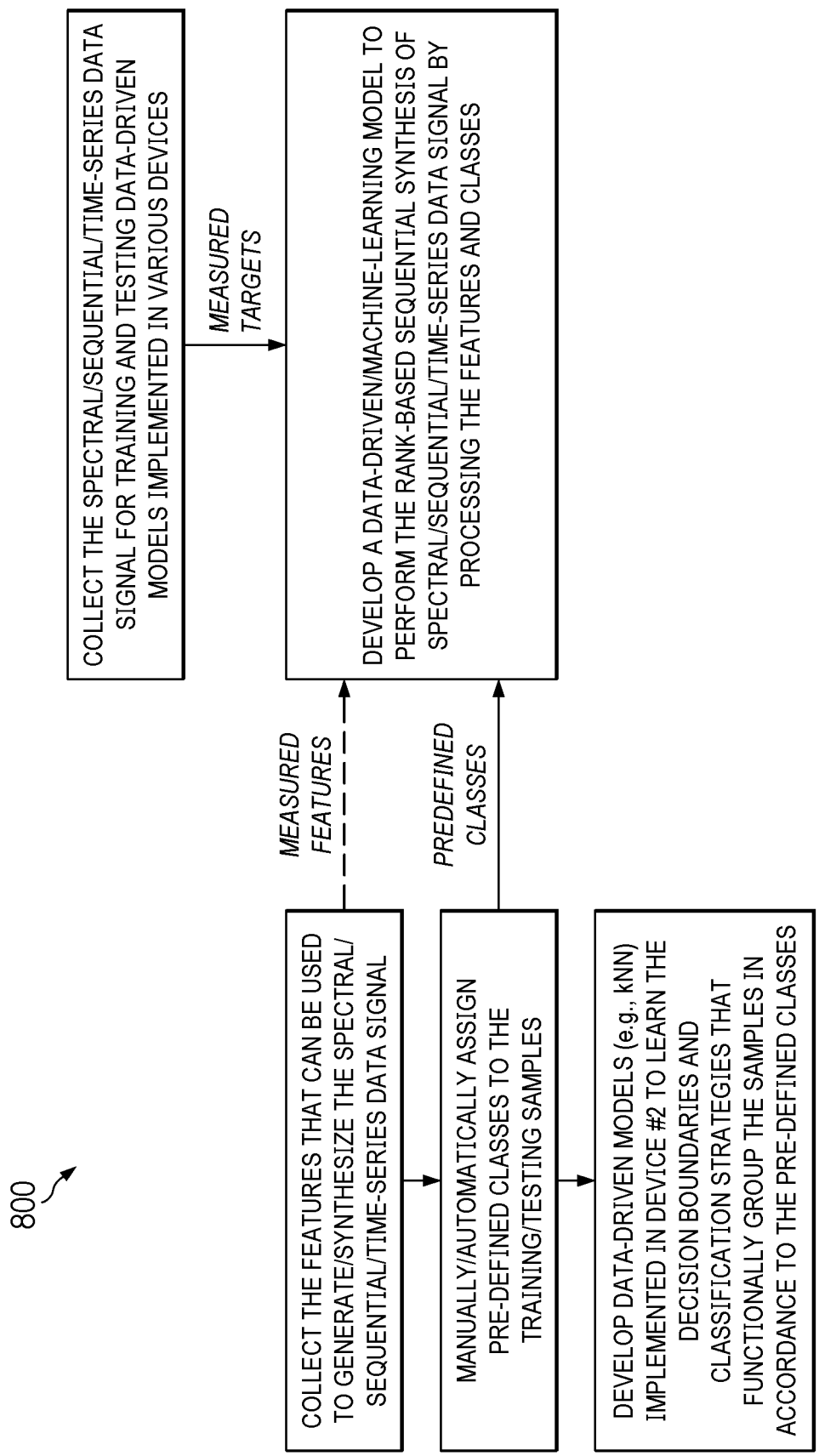
FIG. 8 is a flowchart of a method for developing a stacked data-driven model for rank-based sequential synthesis of sequential/spectral/time-series data by processing features and classes and for developing data-driven models implemented in Device #2 to learn the decision boundaries and classification strategies that functionally group the samples in accordance to the pre-defined classes.

FIG. 8 is a flowchart of a method 800 for developing a stacked data-driven model for rank-based sequential synthesis of sequential/spectral/time-series data by processing features and classes and for developing data-driven models implemented in Device #2 to learn the decision boundaries and classification strategies that functionally group the samples in accordance to the pre-defined classes. The method 800 is applied on a training and testing dataset for purposes of model development.

Figure 9:
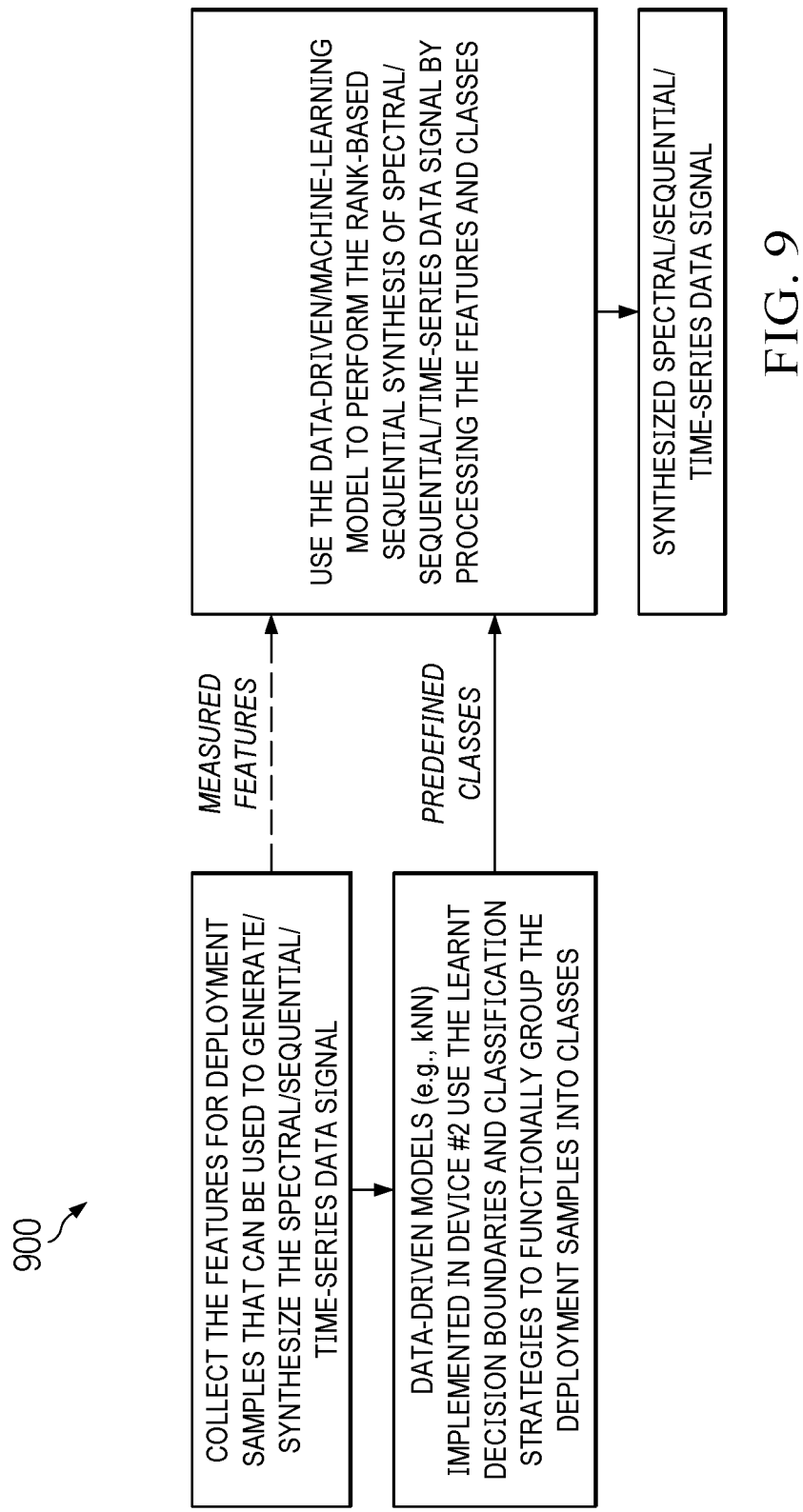
FIG. 9 is a flowchart of a method for rank-based sequential synthesis of a spectral/sequential/time-series data signal during the deployment stage when the SNN processes the measured features and predicts classes for new, unseen deployment samples.

FIG. 9 is a flowchart of a method 900 for rank-based sequential synthesis of a spectral/sequential/time-series data signal during the deployment stage when the SNN processes the measured features and predicts classes for new, unseen deployment samples. The predicted classes are generated by the data-driven models (e.g., kNN) implemented in Device #2 that use the learned decision boundaries and classification strategies to functionally group the deployment samples into classes.

Figure 10:
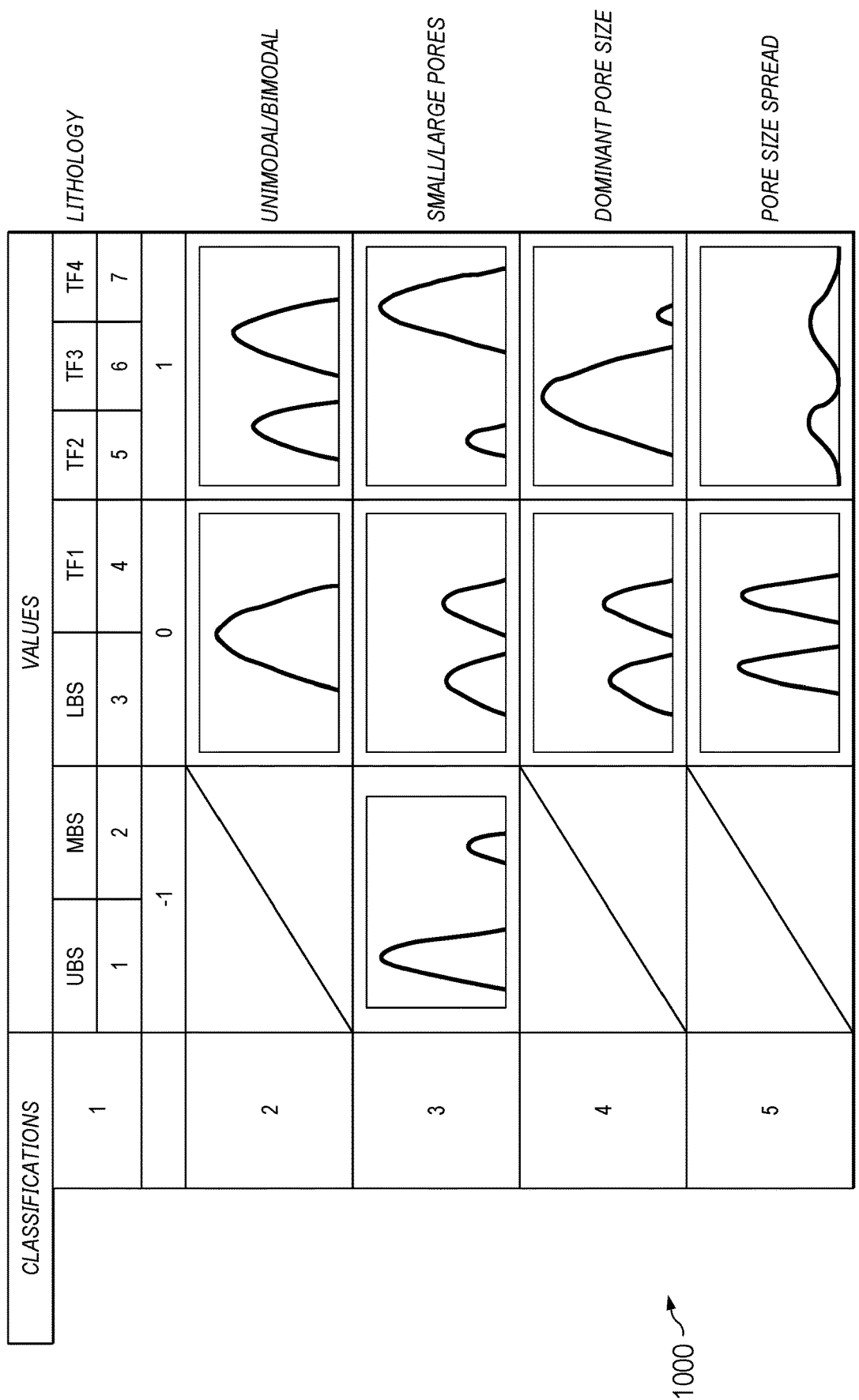
FIG. 10 is a table showing the classes assigned by the kNN method implemented in the Device #2.

FIG. 10 is a table 1000 showing the classes assigned by the kNN method implemented in the Device #2. The table 1000 may be used for synthesizing NMR T2 spectral data. The kNN method is first trained to detect these classes for training/testing dataset. After training and evaluation, the kNN method is deployed on the deployment dataset for purposes of assigning classes to deployment samples. These classes serve as additional features. Any classification or clustering algorithm can be used in place of the kNN method for implementation in Device #2.

After selecting the conventional logs to be used as features for the NMR T2 synthesis, five classifications are assigned to each depth (i.e., sample) and used as synthetic discrete-valued features for improving the accuracy of the desired synthesis. This can be considered as an effort to categorize depths based on the five lithological/geological/textural features, or classes, assigned by Device #2. The value of Class 1 is an integer ranging from 1 to 7 identifying seven distinct intervals based on different lithologies and mineralogical compositions at a given depth. FIG. 10 presents schematic plots of qualitative aspects or pore size distribution captured by Classes 2-5. Class-2 is either 0 or 1 and identifies unimodal and bimodal pore size distribution, respectively, at the given depth. Class 3 is an indicator of pore sizes in a bimodal system, such that its value is −1, 0, or 1 and identifies the abundance of small pores, comparable volumes of small and large pores, and abundance of large pores, respectively. Similar to Class 3, Class 4 is an indicator of relative abundance of pores of certain pore size in a bimodal system, such that Class 4 is assigned a value of 1 when a pore size is negligible; otherwise, claim 4 is assigned a value of 0. Those assigned as 1 for Class 4 are bimodal distributions but can be regarded as unimodal distributions for certain cases. Class 5 defines the deviation/spread of pore sizes around the two dominant pore sizes of a bimodal distribution, such that a value of 1 indicates that the spreads around the two peaks are wide, and a value of 0 indicates either a unimodal distribution or a narrow spread around the two dominant pore sizes. In brief, Class 1 classifies intervals based on lithology, Class 2 identifies a number of peaks in the pore size distribution, Class 3 identifies the dominant pore sizes in bimodal pore systems, Class 4 checks if certain pore sizes can be neglected, and Class 5 captures a difference in the deviation of pore size distributions. These classes help improve the synthesis as they provide relevant, additional, and valuable information to the data-driven models about various depths. These classes are first manually/automatically labeled for the training and testing dataset. Following that, kNN model trained on the labelled training and testing dataset are applied on the deployment dataset to assign these classes to each deployment sample.

FIG. 11 is a diagram 1100 showing an implementation of a neural network with two hidden layers that process 10 conventional logs and 5 classes assigned by Device #2 to generate 64-dimensional NMR T2 spectral data.

Table 5 shows a 15% improvement in the synthesis of NMR T2 spectral data when the 5 classes are used for the desired synthesis as compared to when no classes are used for the synthesis tasks. Significant improvements are observed when classes are implemented as additional features to develop data-driven models for NMR T2 synthesis on both training and testing dataset.

TABLE 5

| | Training | | Testing | |
|---|---|---|---|---|
| | $R^2$ | NRMSE | $R^2$ | NRMSE |
| With Classifications | 0.8574 | 0.1201 | 0.8549 | 0.1218 |
| Without Classifications | 0.7100 | 0.1760 | 0.7152 | 0.1690 |

These classes are created using a KNN algorithm in one of the embodiments. In other implementations, other classification/clustering algorithms can also be used to relate the features logs/data/signals to the output signals to generate the desired classifications.

Figure 12:
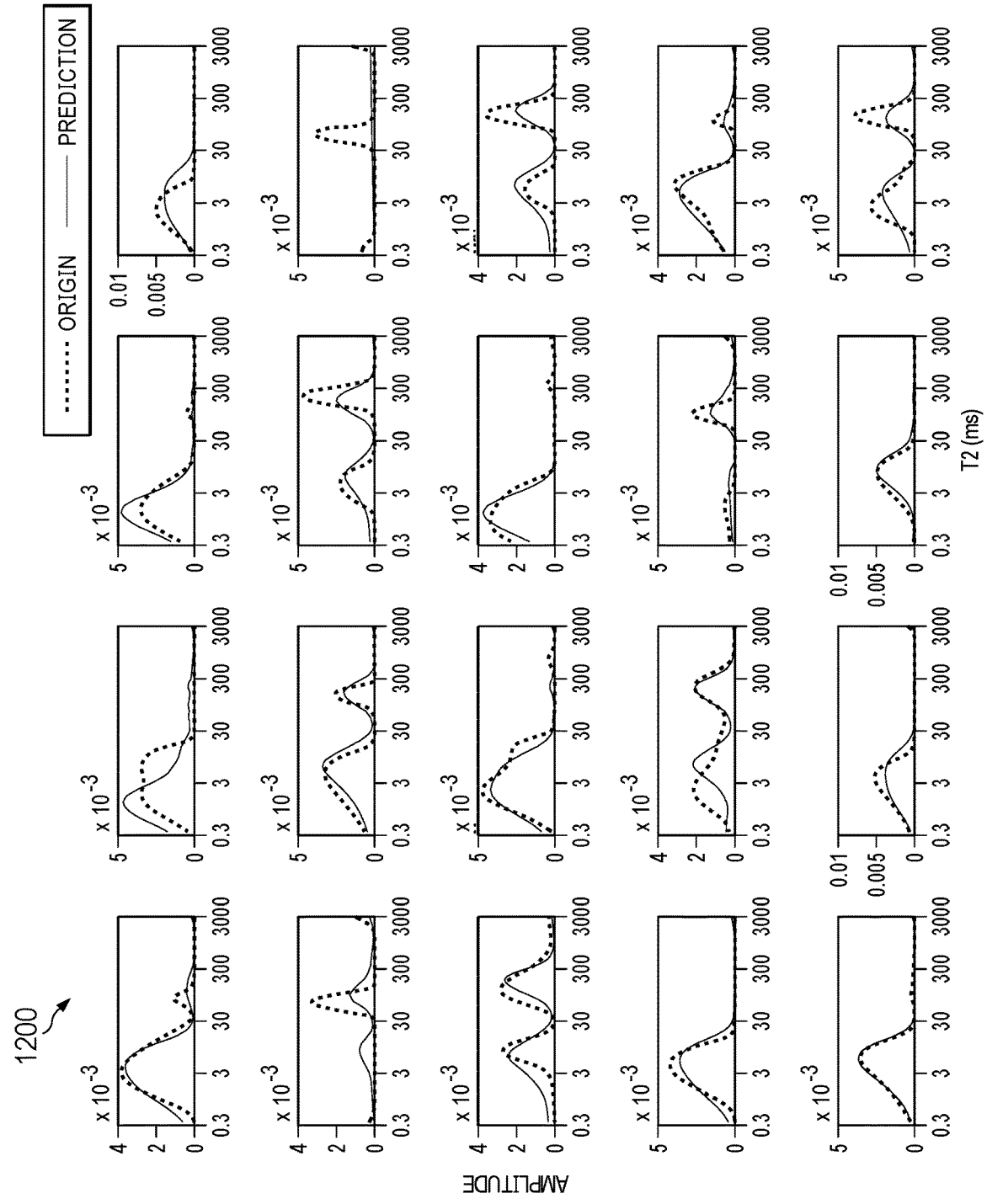
FIG. 12 is a set of graphs presenting the efficacy of the classes assigned by Device #2 for improving the synthesis of NMR T2.

FIG. 12 is a set of graphs 1200 presenting the efficacy of the classes assigned by Device #2 for improving the synthesis of NMR T2. During the kNN training, Classes 2-5 can be generated relatively easily for depths where T2 distribution responses have been acquired. Class 1 is provided by a geology expert. However, during the deployment of the trained kNN for the synthesis of T2 distribution, Classes 1-5 need to be predicted prior to the primary objective of generating the T2 distribution. To that end, 5 KNN classification models, specially designed for predicting the 5 categories shown in FIG. 10, are used to generate Classes 1-5. The goal of the KNN algorithm is to first relate the available easy-to-acquire logs to the NMR T2 distribution, which can then be easily related to Classes 1-5. Once the KNN algorithm is well trained and tested for accurately relating the easy-to-acquire logs to Classes 1-5 in the presence of the NMR T2 distributions, the KNN model can be subsequently used to generate Classes 1-5 in the absence of the NMR T2 distribution. The KNN algorithm and other such implementations classify new deployment samples based on various similarity measures.

FIG. 12 shows the comparison of the original T2 distributions with those synthesized using Classes 1-5 and the model shown in Table 5 for the testing dataset, such that the dashed curve identifies the original T2 distribution and the solid curve identifies the synthesized T2 distribution.

While several embodiments have been provided in the present disclosure, it may be understood that the disclosed systems and methods might be embodied in many other specific forms without departing from the spirit or scope of the present disclosure. The present example, especially those using neural networks and DD logs, are to be considered as illustrative and not restrictive, and the intention is not to be limited to the details given herein. For example, the various elements or components may be combined or integrated in another system or certain features may be omitted, or not implemented. Neural network models can be replaced by any other machine learning model for regression-type tasks, and DD logs can be replaced by any time-series, sequential, or spectral data.

In addition, techniques, systems, subsystems, and methods described and illustrated in the various embodiments as discrete or separate may be combined or integrated with other systems, components, techniques, or methods without departing from the scope of the present disclosure. Other items shown or discussed as coupled may be directly coupled or may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. A method comprising:
   performing processing of a training dataset to obtain a processed training dataset;
   building a first machine learning model based on the processed training dataset;
   generating output signals using the first machine learning model, wherein the output signals are dielectric-dispersion (DD) logs or nuclear magnetic resonance (NMR) logs;
   computing ranks of the output signals based on an accuracy of prediction of the first machine learning model;
   computing classifications of the output signals, wherein the classifications are based on a composition, an abundance of pores, a deviation of pore sizes, a number of peaks in a pore size distribution, or a dominant pore size;
   building a set of stacked machine learning models based on the ranks and the classifications;
   using the set to predict conductivity or a permittivity of a soil, generate subsurface well log data, or generate NMR data; and
   implementing an oil and gas operation based on the conductivity, the permittivity, the subsurface well log data, or the NMR data.

2. The method of claim 1, wherein the training dataset comprise at least one of a training input signal, a training output signal, or a deployment input signal.

3. The method of claim 1, wherein the first machine learning model is a neural network model, a support vector machine model, or a random forest model.

4. The method of claim 1, wherein the classifications are further based on a pore size distribution.

5. The method of claim 1, further comprising further computing the classifications using a classification algorithm.

6. The method of claim 5, wherein the classification algorithm is a k-nearest neighbor (kNN) algorithm or a random forest classifier algorithm.

7. The method of claim 1, further comprising further using the set to predict the conductivity or the permittivity of a soil.

8. The method of claim 1, further comprising further using the set to generate the subsurface well log data.

9. The method of claim 1, further comprising further using the set to generate the NMR data.

10. The method of claim 1, wherein the conductivity and the permittivity are frequency-dependent.

11. An apparatus comprising:
    a memory configured to store instructions; and
    a processor coupled to the memory and configured to execute the instructions to cause the apparatus to:
    perform processing of a training dataset to obtain a processed training dataset;
    build a first machine learning model based on the processed training dataset;
    generate output signals using the first machine learning model, wherein the output signals are dielectric-dispersion (DD) logs or nuclear magnetic resonance (NMR) logs;
    compute ranks of the output signals based on an accuracy of prediction of the first machine learning model;
    compute classifications of the output signals, wherein the classifications are based on a composition, an abundance of pores, a deviation of pore sizes, a number of peaks in a pore size distribution, or a dominant pore size;
    build a set of stacked machine learning models based on the ranks and the classifications;
    use the set to predict a conductivity or a permittivity of a soil, generate subsurface well log data, or generate NMR data; and
    implement an oil and gas operation based on the conductivity, the permittivity, the subsurface well log data, or the NMR data.

12. The apparatus of claim 11, wherein the training dataset comprises at least one of a training input signal, a training output signal, or a deployment input signal.

13. The apparatus of claim 11, wherein the first machine learning model is a neural network model.

14. The apparatus of claim 11, wherein the classifications are further based on a pore size distribution.

15. The apparatus of claim 11, wherein the processor is further configured to further compute the classifications using a classification algorithm.

16. The apparatus of claim 15, wherein the classification algorithm is a k-nearest neighbor (kNN) algorithm.

17. The apparatus of claim 11, wherein the processor is further configured to execute the instructions to cause the apparatus to further use the set to predict the conductivity or the permittivity of the soil.

18. The apparatus of claim 11, wherein the processor is further configured to execute the instructions to cause the apparatus to further use the set to generate the subsurface well log data.

19. The apparatus of claim 11, wherein the processor is further configured to execute the instructions to cause the apparatus to further use the set to generate the NMR data.

20. The apparatus of claim 11, wherein the conductivity and the permittivity are frequency-dependent.

21. A computer program product comprising instructions that are stored on a non-transitory computer-readable medium and that, when executed by a processor, cause an apparatus to:
    perform processing of a training dataset to obtain a processed training dataset;
    build a first machine learning model based on the processed training dataset;
    generate output signals using the first machine learning model, wherein the output signals are dielectric-dispersion (DD) logs or nuclear magnetic resonance (NMR) logs;
    compute ranks of the output signals based on an accuracy of prediction of the first machine learning model;
    compute classifications of the output signals, wherein the classifications are based on a composition, an abundance of pores, a deviation of pore sizes, a number of peaks in a pore size distribution, or a dominant pore size;
    build a set of stacked machine learning models based on the ranks and the classifications;

use the set to predict a conductivity or a permittivity of a soil, generate subsurface well log data, or generate NMR data; and implement an oil and gas operation based on the conductivity, the permittivity, the subsurface well log data, or the NMR data.

22. The computer program product of claim 21, wherein the ranks are based on accuracy of prediction.

* * * * *